United States Patent [19]

Jimmy

[11] Patent Number: 4,822,161

[45] Date of Patent: Apr. 18, 1989

[54] ILLUMINATING SPECTACLE APPARATUS

[76] Inventor: Michael F. Jimmy, P.O. Box 2183, Barrhead, Alberta, Canada

[21] Appl. No.: 145,148

[22] Filed: Jan. 19, 1988

[51] Int. Cl.⁴ ............................................. G02C 1/00
[52] U.S. Cl. ..................................... 351/158; 351/41
[58] Field of Search ................ 351/41, 158, 124, 154, 351/51, 52; 362/103

[56] References Cited

U.S. PATENT DOCUMENTS

| | | | |
|---|---|---|---|
| 1,555,388 | 9/1925 | Schumacher | 351/51 |
| 2,682,724 | 7/1954 | Pattillo | 351/52 |
| 2,981,022 | 4/1961 | Anger | 351/51 |
| 3,526,450 | 9/1970 | Berry | 351/52 |
| 3,774,998 | 11/1973 | Kise | 351/51 |
| 4,254,451 | 3/1981 | Cochran | 362/103 |
| 4,257,691 | 3/1981 | Brooks | 351/158 |

FOREIGN PATENT DOCUMENTS 2554605 5/1985 France .................................. 351/158

OTHER PUBLICATIONS

Review of Optometry, Deaf See What We Hear, 2/85, 351/158.

Primary Examiner—Rodney B. Bovernick
Attorney, Agent, or Firm—Leon Gilden

[57] ABSTRACT

An illuminating spectacle apparatus is set forth wherein a generally "U" shaped framework is provided with a forward centrally positioned "U" shaped inner and outer lens. Between the respective inner and outer lens are positioned a series of lights constructed and arranged for sequential flashing by a remote power supply and control box arrangement.

1 Claim, 3 Drawing Sheets

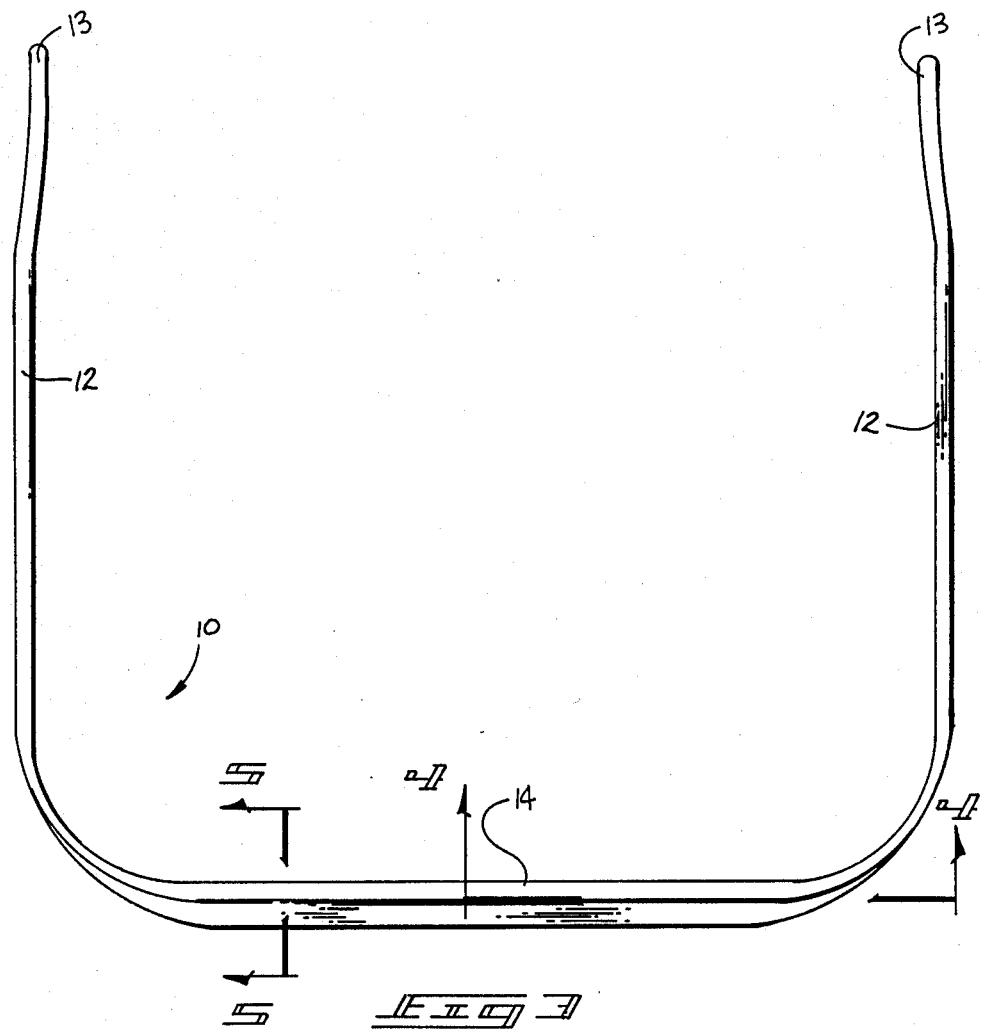
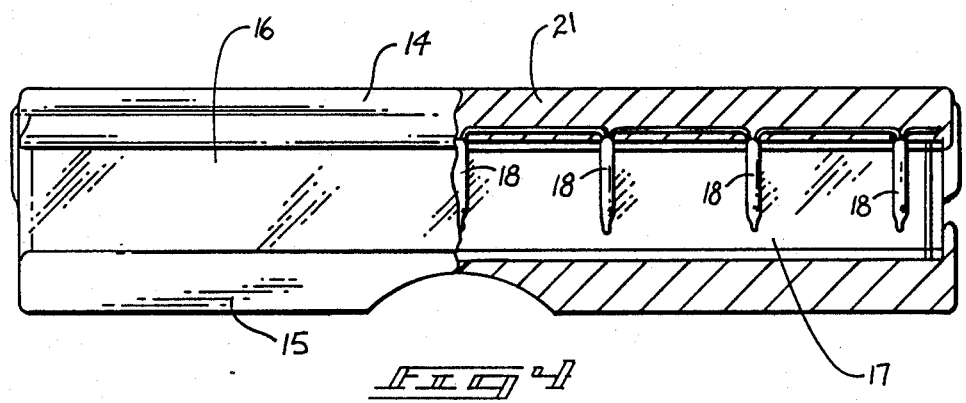

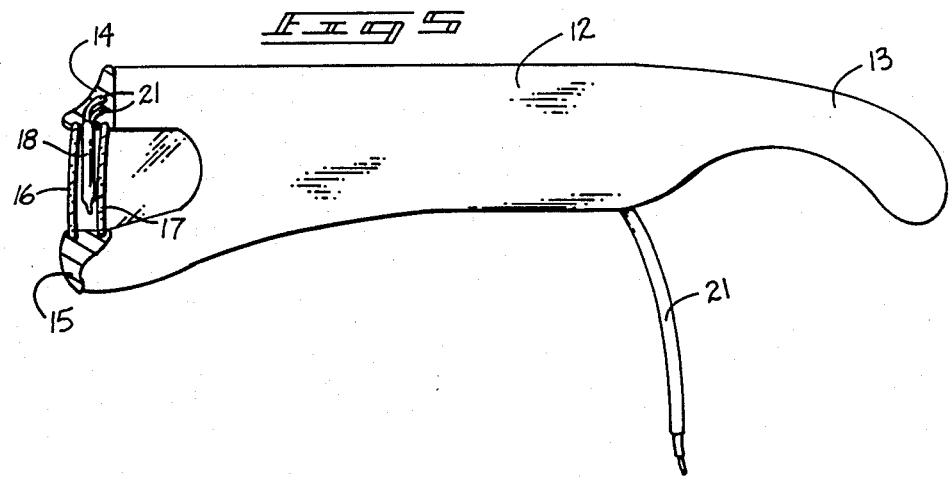
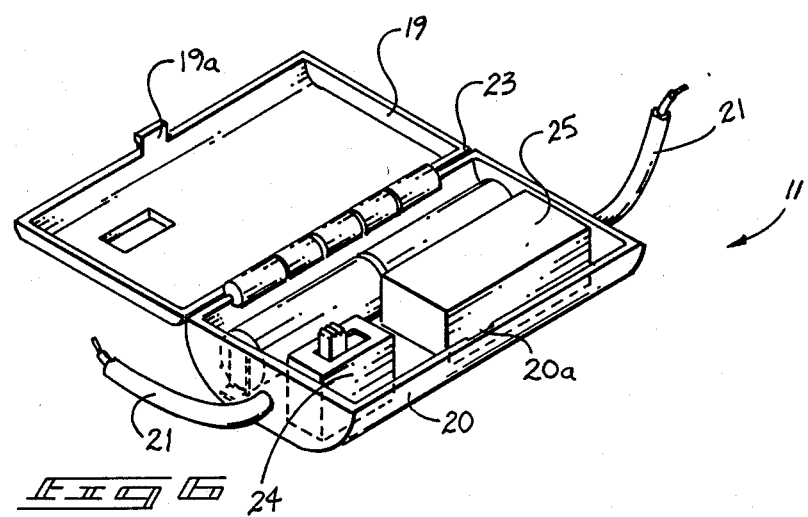
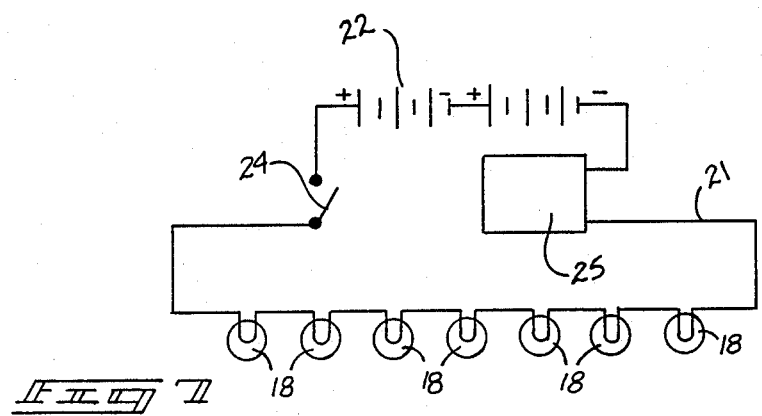

ILLUMINATING SPECTACLE APPARATUS

BACKGROUND OF THE INVENTION

1. Field of the Invention

The present invention relates to spectacles and the like and more particularly pertains to a new and improved illuminating spectacle apparatus which enables a user thereof to provide sequential flashing of lights positioned with the spectacle apparatus.

2. Description of the Prior Art

The use of spectacles for vision correction as well as fashion and decorative purposes is well known in the prior art. As may be appreciated, these devices are generally arranged to provide various effects for various situations, such as social functions and the like. In this connection, there have been several attempts to develop spectacles which may be utilized to complement and enhance various social functions and provide means of expressing individual characteristics. For example, U.S. Pat. No. 2,981,022 to Anger presents a conventional spectacle arrangement wherein the frames are formed with "U" shaped cavities to enable positioning of reflective material therein. While being an effective means of accepting ornamental material within a framework structure in spectacles, the Anger patent fails to provide any means for electronically controlling a predetermined pattern of lights within the frames.

U.S. Pat. No. 3,526,450 to Berry presents an ornamental spectacle covering for conventional eye glasses where an elastic envelope about the associated framework is provided for supporting various ornamental and decorative indicia and characters upon the envelope.

U.S. Pat. No. 2,682,724 to Pattillo sets forth a spectacle frame arrangement wherein the spectacles accommodate a series of reflective brilliants for ornamental and fashion purposes.

U.S. Pat. No. 1,555,388 to Schumacher presents a spectacle frame arrangement for supporting a series of brilliants therealong for ornamental and fashion purposes, as in Pattillo, to accommodate varying human personalities. The method and means of supporting various reflective gems by Schumacher is structurally remote from the instant invention.

U.S. Pat. No. 3,774,998 to Kise presents a "U" shaped spectacle that may be worn either as a spectacle or as a bracelet or necklace wherein various lens elements are positioned therein. The function and application of the Kise patent is of interest relative to the plural function of the apparatus.

As such, it may be appreciated that there is a continuing need for a new and improved spectacle apparatus which addresses both the problems of illumination and accommodation of individual social needs and in this respect, the present invention substantially fulfills this need.

SUMMARY OF THE INVENTION

In view of the foregoing disadvantages inherent in the known types of ornamental spectacles now present in the prior art, the present invention provides an illuminating spectacle apparatus wherein the same provides a plurality of lenses wherein a series of sequentially flashing lights are positioned therebetween for decorative and social enhancement purposes. As such, the general purpose of the present invention, which will be described subsequently in greater detail, is to provide a new and improved ornamental spectacle apparatus which has all the advantages of the prior art ornamental spectacles and none of the disadvantages.

To attain this, the present invention comprises a generally "U" shaped framework wherein a plurality of "U" shaped lenses are positioned with a space therebetween whereby a series of lights are operative for sequential flashing. A power supply and control box is positionable remote from the spectacles to be oriented relative to the user's body underneath the garments for inconspicuous support.

My invention resides not in any one of these features per se, but rather in the particular combination of all of them herein disclosed and claimed and it is distinguished from the prior art in this particular combination all of its structures for the functions specified.

There has thus been outline, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is of enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved illuminating spectacle apparatus which has all the advantages of the prior art spectacle apparatus and none of the disadvantages.

It is another object of the present invention to provide a new and improved illuminating spectacle apparatus which may be easily and efficiently manufactured and marketed.

It is a further object of the present invention to provide a new and improved illuminating spectacle apparatus which is of a durable and reliable construction.

An even further object of the present invention is to provide a new and improved illuminating spectacle apparatus which is susceptible of a low cost of manufacture with regard to both materials and labor, and which accordingly is then susceptible of low prices of sale to the consuming public, thereby making such ornamental spectacle apparatus economically available to the buying public.

Still yet another object of the present invention is to provide a new and improved illuminating spectacle apparatus which provides in the apparatuses and methods of the prior art some of the advantages thereof, while simultaneously overcoming some of the disadvantages normally associated therewith.

Still another object of the present invention is to provide a new and improved illuminating spectacle apparatus wherein a generally "U" shaped spectacle framework supportingly secures a plurality of spaced "U" shaped lenses.

Yet another object of the present invention is to provide a new and improved illuminating spectacle apparatus wherein a plurality of spaced lenses has positioned therebetween a series of lights oriented and arranged for sequential flashing.

Even still another object of the present invention is to provide a new and improved illuminating spectacle apparatus wherein a power and control unit for powering and controlling the spectacle arrangement of lights is remotely positioned in electrical communication with the spectacles.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is top orthographic view of the instant invention.

FIG. 4 is a frontal orthographic view taken partially in section of the instant invention illustrating the various components, their configuration and relationship.

FIG. 5 is an orthographic side view of the instant invention taken along the lines 5—5 of FIG. 3 in the direction indicated by the arrows.

FIG. 6 is an isometric view of the control unit of the instant invention.

FIG. 7 is a diagrammatic illustration of the electrical circuit of the instant invention.

DESCRIPTION OF THE PREFERRED EMBODIMENT

Figure 1:
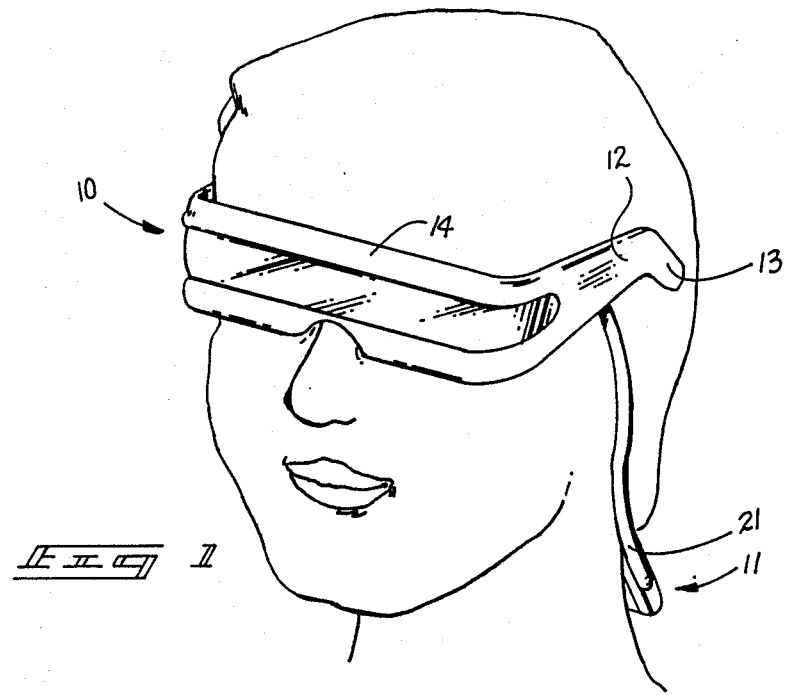
FIG. 1 is a front isometric illustration of the instant invention as worn by an individual.

With reference now to the drawings, and in particular to FIG. 1 to 7 thereof, a new and improved illuminating spectacle apparatus embodying the principles and concepts of the present invention and generally designated by the reference numerals 10 and 11 will be described.

More specifically, it will be noted that the illuminating spectacle apparatus 10 essentially comprises a spectacle framework 10 formed in a "U" shaped configuration including temple straps 12 and ear securement hooks 13. The central forward portion of the framework 10 is formed of an upper frame 14 and a lower frame 15 wherein upper frame 14 is formed of a generally concave exterior profile in cross-section, as illustrated in FIG. 5, to reduce weight of the overall arrangement. To assist in the reduction of weight, the framework 10 and the remotely positionable case 11 are formed of a polymeric material and advantageously, case 11 is of a padded exterior surface to enhance comfort to a user of the instant invention.

Upper and lower frame members 14 and 15 respectively secure therebetween inner and outer "U" shaped lenses 16 and 17 respectively. The "U" shaped lenses are secured between the upper and lower frame members and extend somewhat along the temple straps 12, essentially as illustrated in FIG. 5. A series of lights 18 are secured to upper frame member 14 and are imbedded within said frame member along with associated wiring 21 that extends within the temple straps 12 and emanates therefrom, as illustrated in FIG. 5.

Case 11 is essentially formed of a cover 19 integrally formed with a closure tab 19a securable to a base 20 formed with a mating recess 20a for securement of tab 19a. The cover 19 and base 20 are hingedly secured together by hinge 23, as illustrated in FIG. 6. Included within case 11 are appropriate power supply batteries 22, an activation on/off switch 24 and a commercially available sequencing unit 25 with appropriate wiring depending therefrom to the framework 10.

Figure 2:
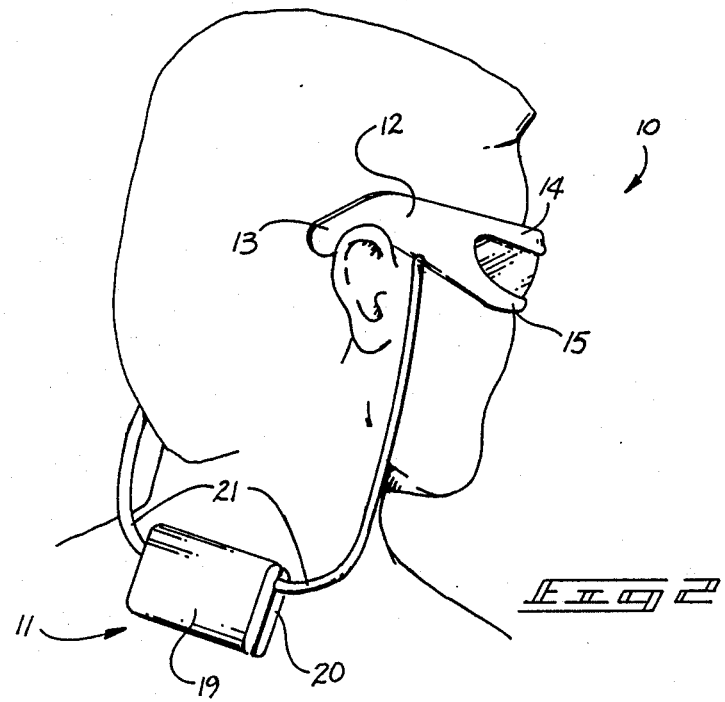
FIG. 2 is a rear isometric illustration of the instant invention as worn by an individual.

As to the manner of usage of operation of the present invention, the same should be apparent from the above description. As illustrated in FIG. 1 and 2, a user merely allows the case 11 to be supported below the framework 10, such as under a torso garment, and upon switching of the on/off switch 24, the included lights 18 between the lenses will illuminate in sequence to create a novel effect.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A spectacle apparatus for forming a novel illumination effect, comprising, a spectacle framework means for securement and alignment with an individual's eyes wherein said framework means is formed in a continuous "U" shaped configuration defined by a forward portion and extending integral legs secured to said forward portion, and a plurality of lenses securable to said spectacle framework at said forward portion wherein said lenses are spaced to accommodate a plurality of illuminating elements therebetween, and a remote power supply means for selectively supplying power to said illuminating elements for sequentially illuminating said elements, and wherein said forward portion is defined by an upper and lower frame portion spaced a distance from one another along the extend of said forward portion wherein said upper and lower frame portions merge with one another in each of said legs, and wherein said lenses are continuous and are secured between said upper and lower frame portions and said lenses are each generally of a "U" shaped configuration defining an enclosed space therebetween, and wherein said illuminating elements comprise a plurality of individual lights electrically communicating with one another and with said remote power supply means, and wherein said remote power supply means includes a cover hingedly securable to a base portion wherein said cover and base portion are padded for comfort to the individual, and wherein said remote power supply means further includes a battery source for supplying power to said illuminating elements and switching means for selectively supplying said power, and a sequencing means for sequencing the plurality of illuminating elements to sequentially illuminate the illuminating elements, and wherein said remote power supply means includes a plurality of elongate flexible electrically conducting wires to conduct electrical energy from said remote power supply means to said individual lights, and said wires being of sufficient length to remotely position said remote power supply means to said spectacle framework.

* * * * *